(12) United States Patent
Oikawa et al.

(10) Patent No.: US 9,663,376 B2
(45) Date of Patent: May 30, 2017

(54) XEROGEL PRODUCTION METHOD

(71) Applicant: Panasonic Intellectual Property Management Co., Ltd., Osaka (JP)

(72) Inventors: Kazuma Oikawa, Osaka (JP); Shigeaki Sakatani, Osaka (JP); Kei Toyota, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 10 days.

(21) Appl. No.: 14/734,400

(22) Filed: Jun. 9, 2015

(65) Prior Publication Data

US 2015/0360961 A1  Dec. 17, 2015

(30) Foreign Application Priority Data

Jun. 17, 2014  (JP) .................. 2014-124008

(51) Int. Cl.
 *C01B 33/16* (2006.01)
 *B01J 13/00* (2006.01)

(52) U.S. Cl.
 CPC .......... *C01B 33/16* (2013.01); *B01J 13/0091* (2013.01)

(58) Field of Classification Search
 CPC ........................ C01B 33/16; B01J 13/0091
 See application file for complete search history.

(56) References Cited

U.S. PATENT DOCUMENTS

| 5,647,962 A | 7/1997 | Jansen et al. |
| 5,795,556 A | 8/1998 | Jansen et al. |
| 6,017,505 A | 1/2000 | Ziegler et al. |
| 6,645,900 B2 | 11/2003 | de Lange et al. |
| 2002/0132941 A1 | 9/2002 | Lange et al. |
| 2009/0104401 A1 | 4/2009 | Nakanishi et al. |

FOREIGN PATENT DOCUMENTS

| DE | 19943166 | 3/2001 |
| EP | 0690023 | 1/1996 |
| JP | 2005-199241 | 7/2005 |
| JP | 3854645 | 9/2006 |
| WO | 2007/010949 | 1/2007 |

OTHER PUBLICATIONS

Sarawade P.B. et al., "Synthesis of hydrophillic and hydrophobic xerogels with superior properties using sodium silicate", Microporous and Mesoporous Materials, Elsevier Science Publishing, New York, US, vol. 139, No. 1-3, Mar. 1, 2011, pp. 138-147.
Database WPI Week 200554 Thomson Scientific, London, GB; AN 2005-526789 XP002747544.
Extended European Search Report dated Oct. 30, 2015 in corresponding European Patent Application No. 15171554.7.
S. S. Kistler, "Coherent Expanded Aerogels and Jellies", Nature, No. 3211, vol. 127, p. 741, May 16, 1931.

*Primary Examiner* — Melvin C Mayes
*Assistant Examiner* — Michael Forrest
(74) *Attorney, Agent, or Firm* — Wenderoth, Lind & Ponack, L.L.P.

(57) ABSTRACT

A xerogel production method includes: adding, to water glass, a basic silicic acid solution having a sol with a particle size between a particle size of the water glass and a particle size of colloidal silica, to acidify and solate the water glass, and polycondensing the solated water glass at 20° C. to 90° C., to obtain a hydrogel; growing the hydrogel by leaving the hydrogel for a certain time period at a constant temperature; hydrophobizing the hydrogel; and drying the hydrophobized hydrogel.

8 Claims, 2 Drawing Sheets

XEROGEL PRODUCTION METHOD

CROSS REFERENCE TO RELATED APPLICATION

The present application is based on and claims priority of Japanese Patent Application No. 2014-124008 filed on Jun. 17, 2014. The entire disclosure of the above-identified application, including the specification, drawings and claims is incorporated herein by reference in its entirety.

BACKGROUND OF THE INVENTION

1. Field of the Invention

The present disclosure relates to a xerogel production method, and in particular to a silica xerogel production method.

2. Description of the Related Art

An aerogel means in a broad sense "a gel containing air as a dispersion medium", which is produced by drying a suitable gel. Here, "aerogels" in a broad sense include aerogels in a narrow sense, namely, a xerogel and further a cryogel. Such gels in a narrow sense have different names depending on a difference in how the gels are dried. A gel produced by supercritical drying is called an aerogel, a gel produced by drying under a normal pressure is called a xerogel, and a gel produced by freeze-drying is called a cryogel. The reason for gels in a narrow sense having various names due to the difference in how the gels are dried is that a dry process of removing a solvent from a gel is the most important of processes for producing an aerogel.

A silica aerogel containing silica particles, which was first synthesized by S. S. Kistler in 1931 (Nature, 127, 741 (1931)), dose not include blowing gas having a low thermal conductivity, such as $CO_2$ and cyclopentane, yet has a pore size equal to or smaller than a mean free path (68 nm) of molecules constituting air. Accordingly, silica aerogels are known to produce excellent heat insulating effects.

Silica aerogels are different from widely used heat insulating materials such as polyurethane (PU), expanded polystyrene (EPS), and a vacuum insulation panel (VIP). The heat insulating capability of silica aerogels shows almost no change over time. Furthermore, silica aerogels have heat resistance of 400° C. or more. Thus, silica aerogels are attracting attention as next-generation heat insulating material.

The heat insulating capability of PU and EPS foamed using gas having a low thermal conductivity falls due to the gas escaping over time. Furthermore, PU and EPS have poor heat resistance, which is a problem.

VIP has excellent heat insulating capability of several mW/mK. However, a small amount of air molecules mix over time from a portion heat-sealed when a core material is vacuum-enclosed. Accordingly, the degree of vacuum of VIP falls. Consequently, VIP has problems such as deterioration over time and heat resistance of about 100° C.

Silica aerogels are superior to existing heat insulating materials, in deterioration over time and heat resistance, and have an excellent thermal conductivity of about 15 mW/mK. However, silica aerogels have a network structure, like a string of beads, which includes several tens of nanometer-order silica particles in point contact, and thus has rather low mechanical strength. In view of this, in order to overcome the fragility, study has been made to improve strength of silica aerogels by combining, for instance, silica aerogels with fibers, a nonwoven fabric, and resin.

Inorganic nano porous body such as a silica aerogel is typically synthesized by a sol-gel method which is a solution phase reaction. The material of a silica aerogel is water glass (sodium silicate solution) and an alkoxysilane compound such as tetramethoxysilane. Hydrolysis is caused by a liquid medium such as water or alcohol, which is mixed with a catalyst as necessary. The gel material is polycondensed in a liquid medium, to form a wet gel (hydrogel, water glass containing water). After that, the wet gel undergoes a silylation reaction (optionally, following solvent displacement) and lastly, a liquid medium in the wet gel is evaporated and dried.

The drying techniques include supercritical drying and non-supercritical drying (normal pressure drying, freeze drying) mentioned above. Dynax Corporation (WO2007/010949) and Cabot Corporation (Japanese Patent No. 3854645), for instance, disclose synthesis of an inorganic nano porous body.

The process of synthesizing a wet gel from material is called aging. Aging is a process for forming a precise network structure of silica particles by causing a polycondensation reaction of silicic acid to proceed, which is generated by hydrolyzing water glass or an alkoxysilane compound. Aging is typically performed at a temperature ranging from 50° C. to 90° C. in an airtight container so that a liquid medium and a catalyst do not volatilize.

SUMMARY OF THE INVENTION

However, a method for producing, using water glass as a main material, an aerogel heat-insulating material which forms an inorganic nano porous body requires a long time, that is, 24 hours or more in order to sufficiently grow a gel backbone in the aging process.

Accordingly, there has been a problem that products remain unfinished between processes, which makes a production process complicated and increases a time period for the production process. The strength of the gel skeleton structure is not sufficiently improved if an aging time is 24 hours or less. Furthermore, an excessively long aging time yields less effect of aging on the improvement in the strength of the gel skeleton structure, and productivity may rather fall.

An object of the present disclosure is to provide a xerogel production method which achieves a reduction in aging time.

According to the present disclosure, an acid sol solution is prepared, and thereafter a high molality basic sodium silicate solution having a particle size of several to 30 nm is added to the sol solution while stirring the sol solution. Consequently, silica particles precipitate around the added silica particles.

The inventors have found that a process which requires 12 hours to form a gel can be consequently shortened down to 2 hours. The resultant product is a silica aerogel called a silica nano porous body, and is an excellent heat insulating material.

A high molality basic sodium silicate solution is used to prepare a sol for a water glass based porous body, thus achieving a reduction in aging time.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE PREFERRED EMBODIMENT

Figure 1:
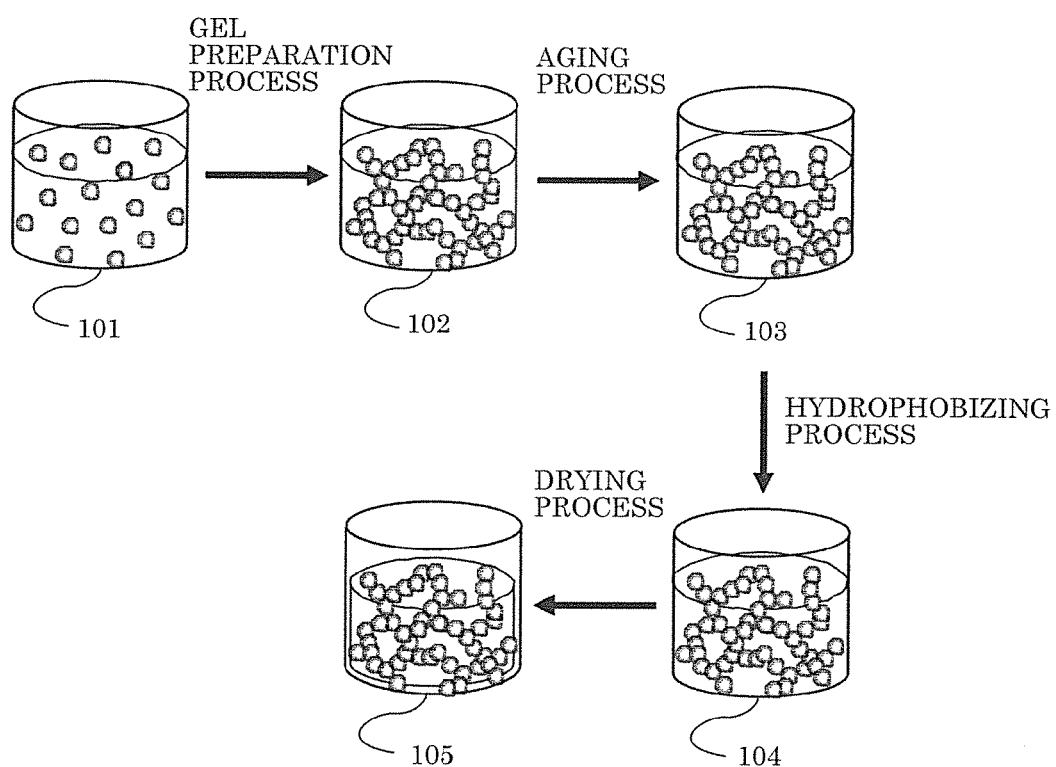
FIG. 1 illustrates the entire processing according to an embodiment.

A description is given of an embodiment.
(Xerogel)

A silica xerogel according to the present embodiment is prepared by the method below. The material is water glass (sodium silicate solution). Water glass is ion-exchanged by the ion-exchange resin method or by electrodialysis to remove sodium, thus producing a silicic acid solution. A high molality sodium silicate which serves as a pH adjustor and is the core of silica growth is added to the silicic acid solution to generate a dehydrated condensate. A silica xerogel is produced by this production method. The details will be later described separately.

A silica xerogel generated by the production method according to the present embodiment has an average pore size of 10 nm to 60 nm, a pore volume of 3.0 cc/g to 10 cc/g, and a specific surface area of 300 cm$^2$/g to 1000 cm$^2$/g. The average pore size may be 10 nm to 55 nm, and more specifically, 20 nm to 50 nm.

If the average pore size is smaller than 10 nm, a bulk density of a xerogel is high, and consequently a proportion of a thermally conductive solid component (silica particles) increases, thus resulting in an increase in a value of thermal conductivity.

Furthermore, if the average pore size is greater than 55 nm, a bulk density of a xerogel is low, and a thermally conductive solid component decreases. Yet, a proportion of space in the xerogel increases, and thus convection of air (nitrogen molecules) exerts a stronger effect and the value of a thermal conductivity is increased.

If the average pore size is 20 nm to 50 nm, a xerogel has a substantially ideal bulk density, and a thermal conductivity has a small value.

The pore volume may be 4.0 cc/g to 10 cc/g, and more specifically, 5.0 cc/g to 10 cc/g.

If the pore volume is less than 4.0 cc/g, the proportion of a thermally conductive solid component increases, and thus the value of a thermal conductivity is increased, as with the case where the average pore size is smaller than 10 nm.

If the pore volume is greater than 10 cc/g, a thermally conductive solid component decreases, yet a proportion of space in a xerogel increases, and thus convection exerts a stronger effect, which increases a value of a thermal conductivity.

If the pore volume is 5.0 cc/g to 10 cc/g, a thermal conductivity stably has a small value. If the average pore size and the pore volume of a silica xerogel are in the above ranges, such a silica xerogel has excellent heat insulating properties, and thus is suitable as a heat insulating material.

The average pore size and the pore volume of a silica xerogel can be controlled with ease by adjusting, for instance, a concentration of silicic acid in water glass which is the material, a concentration and an amount of addition of a basic silicic acid solution used for solation, conditions for gelling a sol (temperature, time), and aging conditions (temperature, time).

In addition, the average pore size and the value of a pore volume of a silica xerogel in the present embodiment are meant to be values measured by the nitrogen adsorption method.

(Xerogel Production Method)

A description is given of entirety of a method for producing a silica xerogel according to an embodiment, with reference to FIG. 1.

The method includes (1) a gel preparation process of gelling a sol of water glass 101 which is a material of a xerogel into hydrogel 102, (2) an aging process of reinforcing a silica backbone of hydrogel 102 to obtain backbone reinforced hydrogel 103, (3) a hydrophobizing process of hydrophobizing the surface of the hydrogel to obtain surface modified gel 104, in order to prevent shrinkage caused when surface modified gel 104 is dried later, and (4) a drying process of lastly removing solvent to obtain xerogel 105.

(1) Gel Preparation Process

In the gel preparation process, a basic silicic acid solution with a sol having a particle size between a particle size of water glass 101 and a particle size of colloidal silica is added to water glass 101, to acidify and solate water glass 101, and solated water glass 101 is polycondensed at 20° C. to 90° C., to obtain hydrogel 102. More specifically, water glass 101 is acidified by removing sodium in water glass 101 using the ion-exchange resin method or electrodialysis, so as to be solated. A base is added as a catalyst to solated water glass 101 to polycondense the water glass to obtain hydrogel 102.

<Water Glass 101>

Water glass 101 is a sodium silicate solution. Water glass 101 is a liquid in which $SiO_2$ (silicon dioxide) and $Na_2O$ (sodium oxide) are dissolved in $H_2O$ at various ratios. The molecular formula of water glass 101 is expressed by $Na_2O \cdot nSiO_2 \cdot mH_2O$. This n is called a molar ratio and expresses a mixing ratio of $Na_2O$ and $SiO_2$. The types of water glass 101 specified by Japanese Industrial Standard (JIS K1408) include No. 1, No. 2, and No. 3 that have molar ratios of 2, 2.5, and 3, respectively. Water glass 101 that is the material in the present embodiment is diluted with pure water and used, and thus a suitable molar ratio is not particularly limited, and water glass having a molar ratio of 2 to 3 which is widely used can be used.

<Basic Silicic Acid Solution>

The base added as a catalyst is a basic silicic acid solution, and is produced from water glass 101. A basic silicic acid solution is a material obtained by removing sodium unnecessary to form hydrogel 102 from water glass 101 and thereafter being stabilized on the base side, and is not either water glass 101 or colloidal silica.

A feature of the basic silicic acid solution is that a sol has a particle size (1 nm to 30 nm) intermediate between those of water glass 101 and colloidal silica. Here, colloidal silica is a colloid of $SiO_2$ or a colloid of a $SiO_2$ hydrate. Colloidal silica typically has a particle size of 10 nm to 300 nm, and does not have a fixed structure.

Water glass 101 is a concentrated aqueous solution containing sodium silicate, and is a viscous liquid obtained by heating water in which sodium silicate is dissolved.

A basic silicic acid solution is obtained by removing sodium from such water glass 101, and thereafter increasing a silica concentration up to 8% or more.

The following describes details of a basic silicic acid solution in the present embodiment. The basic silicic acid solution used in the present embodiment may have basicity ranging from pH 8.0 to pH 11.0, and more specifically from pH 9.0 to pH 10.0.

If the pH of the basic silicic acid solution is lower than 8.0, a larger amount of a basic silicic acid solution needs to be introduced in order to adjust the pH of water glass 101 solution (pH 3.0 or less) from which sodium has been removed to 5.0 to 8.0, to prepare a sol solution. As a result, a large amount of solvent such as water in which silicic acid is dispersed is mixed, and thus the actual concentration of silicic acid is diluted. Consequently, the intensity of the backbone of hydrogel 102 is often insufficient.

On the contrary, if the pH of the basic silicic acid solution exceeds 11.0, it is sufficient to introduce a smaller amount of a basic silicic acid solution in order to adjust the pH of water glass 101 solution (pH 3.0 or less) from which sodium has been removed to 5.0 to 8.0, to prepare a sol solution. In this case, however, a concentration of silicic acid necessary for nuclear growth of silica may be, meanwhile, insufficient and an aging time may not be effectively shortened.

The size of silica particles in the basic silicic acid solution may be 1 nm to 30 nm, and more specifically, 5 nm to 30 nm.

If the particle size is smaller than 1 nm, such a small particle size may avoid the particles from providing starting points of nuclear growth, and the effect of shortening an aging time may not be achieved.

If the particle size exceeds 30 nm, the activity of silica particles themselves falls, and besides a uniform silica particle network cannot be formed. Thus, the intensity of hydrogel 102 may be insufficient.

If the particle size is 5 nm or more, it is likely that a comparatively large particle size allows the particles to provide starting points of nuclear growth and the effect of shortening an aging time is achieved.

The basic silicic acid solution used in the present embodiment may have a silicic acid concentration of 13% to 20%, and more specifically, 13% to 16%.

If the concentration of silicic acid in the basic silicic acid solution is lower than 13%, a greater amount of a basic silicic acid solution needs to be added in order to adjust the pH of water glass 101 to a desired pH, and thus the number of silica particles that are to serve as starting points of silica particle growth may decrease, and forming a silica network may not effectively proceed.

If the concentration of silicic acid exceeds 20%, uniform dispersion of silica particles themselves will be difficult.

If the concentration of silicic acid is 13% to 16%, silica particles at an appropriate concentration are uniformly dispersed. Thus, aggregation and segregation of silica particles are less likely to occur, which allows a uniform silica network to be formed.

<Process>

The above basic silicic acid solution is added to the water glass 101 solution from which sodium has been removed, to obtain hydrogel 102 from a sol solution. Hydrogelation of a sol may be performed in an airtight container which prevents a liquid solvent from volatilizing.

A temperature at which a sol is gelled (polycondensed) may be 20° C. to 90° C., and more specifically 50° C. to 80° C.

If a gelling temperature is lower than 20° C., heat necessary for a silicic acid monomer which is an active species of a reaction is not transferred, and growth of silica particles is not promoted even if the silicic acid monomer is added for the purpose of providing a core. In addition, a long time is necessary for causing gelling to sufficiently proceed, and besides generated hydrogel 102 may have low strength and greatly shrink when being dried, and thus desired hydrogel 102 may not be obtained.

If the gelling temperature is lower than 20° C., the growth of silica particles is extremely slow, and takes one day or more.

If the gelling temperature is lower than 50° C., the growth of silica particles is faster than the case of 20° C., yet is relatively slow compared to the case of 50° C., and thus gelling takes a long time to sufficiently proceed. It should be noted that "growth of silica particles" here indicates a dehydrating condensation reaction of silanol groups on the surfaces of silica initial particles.

If the gelling temperature exceeds 90° C., while the growth of silica particles as stated above is significantly promoted, a phenomenon is seen in which water volatilizes in a container and is separated from hydrogel 102 although the container is sealed. This may decrease the volume of hydrogel 102 to be obtained, and a desired silica xerogel may not be obtained.

If the gelling temperature is 80° C. or lower, the growth of silica particles can be promoted while preventing evaporation of moisture contained in a hydrogel to some extent.

(2) Aging Process

In an aging process following the gel preparation process, hydrogel 102 is left for a certain time period at a constant temperature to grow hydrogel 102, or more specifically, hydrogel 102 is developed into backbone reinforced hydrogel 103 having a reinforced backbone of silica. An aging temperature may be 50° C. to 100° C., and more specifically, 60° C. to 85° C.

If the aging temperature is lower than 50° C., necessary heat is not transferred to a silicic acid monomer which is an active species of a reaction as with the gel preparation process. Further, growth of silica particles is not promoted even if a basic silicic acid solution is added for the purpose of causing a silicic acid monomer in the basic silicic acid solution to be a core. As a result, it takes a long time to cause aging to sufficiently proceed. Furthermore, backbone reinforced hydrogel 103 generated may have low strength and greatly shrink when being dried, and thus desired backbone reinforced hydrogel 103 cannot be obtained.

If the aging temperature is at least 50° C. and lower than 60° C., the growth of silica particles is faster than the case of a temperature lower than 50° C. However, the growth of silica particles is relatively slow compared to the case of 60° C. or more, and thus aging will take a long time.

Furthermore, if the aging temperature exceeds 100° C., a phenomenon is seen in which water volatilizes in a container and is separated from hydrogel 102 although the container is sealed. This may decrease the volume of backbone reinforced hydrogel 103 to be obtained, and final xerogel 105 may not be obtained.

If the aging temperature ranges from 85° C. to 100° C., evaporation of moisture contained in a hydrogel can be prevented to some extent while promoting growth of silica particles.

The aging time may be 0.1 hours to 12 hours, and more specifically, 0.5 hours to 6 hours. If the aging time is shorter than 0.1 hours, improvement in the strength of the skeleton structure of backbone reinforced hydrogel 103 may be insufficient.

If the aging time exceeds 12 hours, less effect of aging in the improvement of strength of the skeleton structure of backbone reinforced hydrogel 103 is achieved, and productivity may be lowered on the contrary.

If the aging time is 0.5 hours to 6 hours, the skeleton structure of backbone reinforced hydrogel 103 is stably formed, and furthermore productivity is high.

In order to increase a pore volume and an average pore size of xerogel 105, the gelling temperature and the aging temperature may be increased within the above ranges, and a total of gelling and aging times may be increased within the above range. Furthermore, in order to decrease a pore volume and an average pore size of xerogel 105, the gelling temperature and the aging temperature may be decreased within the above ranges, and a total of gelling and aging times may be decreased within the above range. The aging process that conventionally requires 24 hours or more takes half the time or less.

(3) Hydrophobizing Process

In a hydrophobizing process, backbone reinforced hydrogel 103 is hydrophobized, or more specifically, backbone reinforced hydrogel 103 (also referred to as a hydrogel; a water containing gel) which has been subjected to the aging process is reacted with a silylation agent, to hydrophobize a gel and obtain surface modified gel 104.

Figure 2:
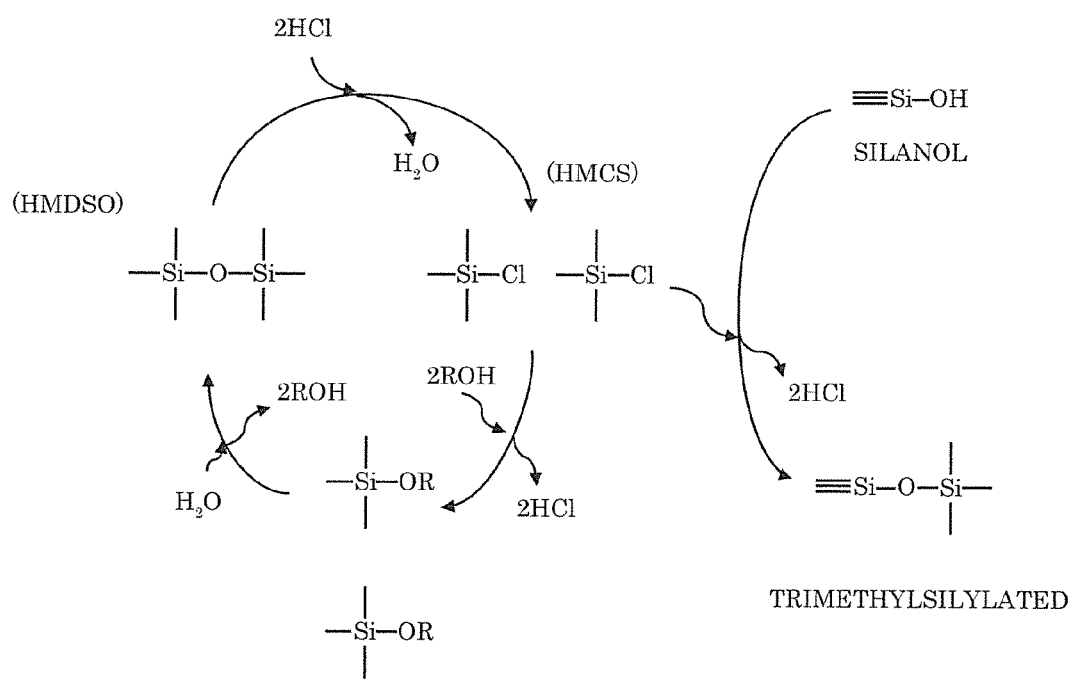
FIG. 2 illustrates a hydrophobizing process according to the embodiment.

FIG. 2 illustrates a hydrophobizing reaction included in a xerogel production method in the embodiment. A trimethylsilylation reaction of silanols is caused in a mixed solvent of hexamethyldisiloxane (hereinafter, HMDSO), HCl, and IPA (isopropyl alcohol). An elementary reaction of this hydrophobization is described with reference to FIG. 2.

First, one molecule of HMDSO reacts with two molecules of chloride, and two molecules of trimethylchlorosilane (hereinafter, TMCS) are generated. The TMCS reacts with silanols on the surfaces of silica secondary particles of backbone reinforced hydrogel 103, to form a trimethyl siloxane bond. Chloride is a by-product produced at this time.

In this hydrophobization reaction, HCl is mixed so that the molar ratio of HCl to the charge amount of HMDSO is 0.01 to 2.0, and TMCS which is an active species can be generated in a reaction system. In that case, a concentration of a hydrochloric acid solution may be 1 N to 12 N, and more specifically, 6 N to 9 N.

If an initial concentration of hydrochloric acid is lower than 1 N, the generated amount of TMCS which is an active species is extremely smaller than the chemical equivalent of silanols on the surface of the hydrogel. Consequently, a trimethyl siloxane bond is not completely formed, and an extremely large amount of unreacted silanols remain.

If an initial concentration of hydrochloric acid is lower than 6 N, the generated amount of TMCS which is an active species is smaller than the chemical equivalent of silanols on the surface of the hydrogel. Consequently, a trimethyl siloxane bond is not sufficiently formed, and a large amount of unreacted silanols remain. When a solvent is evaporated in a drying process, the unreacted silanols undergo dehydration condensation, which causes a xerogel backbone to greatly shrink.

If an initial concentration of hydrochloric acid is higher than 9 N, formation of the above-mentioned trimethyl siloxane bond sufficiently proceeds, and a xerogel can exhibit desired properties. However, a problem arises that a large amount of hydrochloric acid waste is generated during mass production.

If the initial concentration of hydrochloric acid is higher than 12 N, formation of the above-mentioned trimethyl siloxane bond excessively proceeds, and thus a xerogel cannot exhibit desired properties.

The charge amount of a silylation agent may be 100% to 800% of the pore volume of backbone reinforced hydrogel 103, and more specifically, 100% to 300% thereof.

If the charge amount of a silylation agent is less than 100%, it is difficult to physically immerse a hydrogel in the silylation agent, and silanols (Si—OH) on the surface and inside of backbone reinforced hydrogel 103 may remain unreacted. In that case, during drying, a capillary force of a solvent may bring silanols into physical contact, which may cause a dehydrating condensation reaction, and lead to shrinkage and densification of a gel.

If the charge amount of a silylation agent is more than 300%, a reaction itself proceeds, yet an increase in the size of a reaction bathtub and an increase in the amount of a silylation agent to be used result in high cost.

If the charge amount of a silylation agent is more than 800%, this amount may be much more excessive than the necessary minimum amount of a silylation agent which is to react with silanols and in that case, profitability and productivity will fall.

It should be noted that the charge amount of HMDSO (silylation agent) is based on the pore volume of backbone reinforced hydrogel 103, and for example, if the charge amount of a silylation agent is 150%, 1.5 times as much a silylation agent as the pore volume of backbone reinforced hydrogel 103 is introduced. The pore volume of backbone reinforced hydrogel 103 is a value obtained by subtracting a volume per unit weight of $SiO_2$ from the capacity per unit weight of a high molality silicic acid solution, and is calculated using the following formulas.

$$\text{Pore volume of backbone reinforced hydrogel 103} \\ \text{(volume of water in gel)} = \text{volume of high molality silicic acid solution} - \text{volume of } SiO_2 \quad (1)$$

$$\text{Volume of high molality silicic acid solution} = \text{weight of high molality silicic acid solution} \times [g]/\text{density of high molality silicic acid solution (1.1) [cm}^3/\text{g]} \quad (2)$$

$$\text{Volume of } SiO_2 = (\text{weight of high molality silicic acid solution} \times [g] \times \text{concentration of silicic acid})/\text{density of } SiO_2 (2.2) \text{ [cm}^3/\text{g]} \quad (3)$$

As the silylation agent, a siloxane solvent represented by $R_3SiO(SiR_2O)_nSiR_3$ (n is 0 to 2) is used, and HMDSO (hexamethyldisiloxane), octamethyltrisiloxane, or decamethyltetrasiloxane may be used.

Further, silane expressed by general formula $R1_3SiCl$ or $R1_nSi(OR_2)_{4-n}$ (in the formulas, R1 and $R_2$ do not have connection and are C1-C6 linear alkyl, cyclic alkyl, or phenyl) is used as a silylation agent, and hexamethyldisilazane (hereinafter, HMDS) is also suitable.

As trimethylchlorosilane (hereinafter, TMCS) may be used as $R1_3SiCl$, and methyltrimethoxysilane (MTMS) may be used as $R1_nSi(OR_2)_{4-n}$.

A hydrophobizing reaction is caused in a solvent as necessary, and generally caused at 20° C. to 100° C., or more specifically at 40° C. to 70° C.

If a reaction temperature is lower than 20° C., a silylation agent may not be sufficiently diffused and hydrophobizing may not be sufficiently performed.

If a reaction temperature exceeds 100° C., a silylation agent itself volatilizes, and a silylation agent necessary for a reaction may not be supplied to the outside and inside of backbone reinforced hydrogel 103.

If a reaction temperature ranges from 40° C. to 70° C., molecular motion of the silylation agent is active, and thus the solvent quickly diffuses, and a hydrophobizing reaction proceeds efficiently.

The solvent to be used may be at least one of alcohols including methanol, ethanol, 2-propanol, tert-butanol, and ethylene glycol, ketones including acetone and methyl ethyl ketone, or straight-chain aliphatic hydrocarbons including pentane, hexane, and heptane.

Backbone reinforced hydrogel 103 is solid and hydrophilic, whereas a silylation agent is liquid and hydrophobic. Accordingly, reinforced hydrogel 103 and a silylation agent are not mixed, which causes a solid-liquid heterogeneous reaction. This shows that alcohols or ketones which are amphiphilic solvents may be used, or alcohols may be rather used, in order to cause a silylation agent which is an active species to efficiently react with backbone reinforced hydrogel 103.

(4) Drying Process

In a drying process, hydrophobized surface modified gel 104 is dried to obtain xerogel 105. At this time, a drying technique used to volatilize a liquid solvent in surface modified gel 104 obtained in the previous process may be a known drying method, or specifically, supercritical drying or non-supercritical drying (normal pressure drying, freeze drying), which is not particularly limited.

Yet, normal pressure drying which is non-supercritical drying may be used from viewpoints of mass productivity, safety, and profitability. A drying temperature and a drying time are not limited, yet rapid heating may cause bumping of the solvent in surface modified gel 104, and generate a large crack in xerogel 105. If xerogel 105 is cracked, although depending on the size of the crack, heat is transferred by the air convection. Consequently, heat insulating properties may deteriorate, and handleability may significantly decrease due to xerogel 105 being powdered.

Furthermore, if surface modified gel 104 is dried in a hot environment at 400° C. or more, a silylation agent which maintains hydrophobicity of xerogel 105 may be separated by thermal decomposition, and the resultant gel may be hydrogel 102 which is no longer hydrophobic.

Accordingly, in order to inhibit the occurrence of cracks in the drying process, surface modified gel 104 may be dried, for example, at a temperature of 100° C. to 200° C. and for 0.5 hours to 4.0 hours under a normal pressure, although the temperature and time may change depending on the type of a solvent to be dried (solvents have different boiling points), an amount of the solvent, a specific surface area of an object to be dried, and others. More specifically, surface modified gel 104 may be dried at 120° C. to 150° C. for 1.0 hour to 3.0 hours.

If surface modified gel 104 is dried at a temperature lower than 100° C., a drying time may exceed 4 hours, and thus many products that are already subjected to the previous process (hydrophobizing process) and need to be dried remain unfinished, resulting in a decrease in productivity, which is not preferable.

If surface modified gel 104 is dried at a temperature higher than 200° C., surface modified gel 104 may be dried taking a time shorter than 0.5 hours. However, this is not preferable since a xerogel is easily cracked, and also from the viewpoints of safety and profitability (electricity and heating expenses).

If surface modified gel 104 is dried at 120° C. to 150° C., surface modified gel 104 is dried within 1.0 hour to 3.0 hours, which is thus preferable from the viewpoints of productivity, safety, and profitability, for instance.

For example, it may take 4 hours to dry, at 200° C., a solvent having a high boiling point and used (to be dried) in large amount like octamethyltrisiloxane (having a boiling point of 153° C.), whereas it may take 0.5 hours to finish drying, at 100° C., a solvent having a relatively low boiling point and used (to be dried) in extremely small amount like HMDSO (having a boiling point of 100° C.).

Xerogel 105 thus obtained according to the present embodiment takes a shorter aging time than a conventional production method. The aging process which conventionally takes 24 hours or more is reduced by half or less.

While the productivity of xerogel 105 is high, xerogel 105 has great heat insulating properties since the volume of pores in xerogel 105 in the present embodiment is 3 cc/g which is extremely large, and furthermore has an average pore size of 10 nm to 60 nm which is smaller than the mean free path of air. Thus, xerogel 105 is applicable to the use in electrical appliances, automobile components, the architecture field, and industrial facilities, for instance.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

A silica xerogel and a silica aerogel can be used as heat insulating materials, and such heat insulating materials are applicable to the use in electrical appliances, automobile components, the architecture field, and industrial facilities, for instance.

What is claimed is:

1. A xerogel production method comprising:
adding, to water glass, a basic silicic acid solution having a sol with a particle size between a particle size of the water glass and 30 nm, to acidify and solate the water glass, and polycondensing the solated water glass at 20° C. to 90° C., to obtain a hydrogel;
growing the hydrogel by leaving the hydrogel for a certain time period at a constant temperature;
hydrophobizing the hydrogel; and
drying the hydrophobized hydrogel.

2. The xerogel production method according to claim 1, wherein the water glass is acidified to a pH ranging from 5.0 to 8.0.

3. The xerogel production method according to claim 1, wherein the particle size of the sol ranges from 1 nm to 30 nm.

4. The xerogel production method according to claim 1, wherein the basic silicic acid solution has a concentration of silicic acid ranging from 13 wt % to 20 wt %.

5. The xerogel production method according to claim 1, wherein the basic silicic acid solution has a pH ranging from 8.0 to 11.0.

6. The xerogel production method according to claim 1, wherein when the hydrogel is hydrophobized, at least one of hexamethyldisiloxane, octamethyltrisiloxane, decamethyltetrasiloxane, trimethylchlorosilane, hexamethyldisilazane, or methyltrimethoxysilane is used.

7. The xerogel production method according to claim 1, wherein when the hydrogel is hydrophobized, at least one of methanol, ethanol, 2-propanol, tert-butanol, or ethylene glycol is used.

8. The xerogel production method according to claim 1, wherein when the hydrophobized hydrogel is dried, the hydrophobized hydrogel is dried at 100° C. to 200° C.

* * * * *